(12) United States Patent
Unezaki et al.

(10) Patent No.: US 9,829,238 B2
(45) Date of Patent: Nov. 28, 2017

(54) DEHUMIDIFYING APPARATUS

(71) Applicants: Fumitake Unezaki, Tokyo (JP); Shinichi Ito, Tokyo (JP)

(72) Inventors: Fumitake Unezaki, Tokyo (JP); Shinichi Ito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 662 days.

(21) Appl. No.: 14/350,379

(22) PCT Filed: Oct. 16, 2012

(86) PCT No.: PCT/JP2012/076724
§ 371 (c)(1),
(2) Date: Apr. 8, 2014

(87) PCT Pub. No.: WO2013/061829
PCT Pub. Date: May 2, 2013

(65) Prior Publication Data
US 2014/0250930 A1    Sep. 11, 2014

(30) Foreign Application Priority Data

Oct. 27, 2011  (JP) ................................. 2011-236347

(51) Int. Cl.
*F25D 21/02*    (2006.01)
*F24F 3/14*     (2006.01)
(Continued)

(52) U.S. Cl.
CPC ........... *F25D 21/02* (2013.01); *B01D 53/261* (2013.01); *B01D 53/265* (2013.01);
(Continued)

(58) Field of Classification Search
CPC . F25D 21/02; F24F 3/1423; F24F 2203/1056; F24F 2203/1032; F24F 2203/1068; F24F 2203/1084
See application file for complete search history.

(56) References Cited

U.S. PATENT DOCUMENTS 3,247,679 A * 4/1966 Meckler ................. F24F 3/056
                                                62/171
4,142,374 A * 3/1979 Ansted .................. F25D 21/008
                                                62/155
(Continued)

FOREIGN PATENT DOCUMENTS

CN    101184957 A     5/2008
JP    48-36775 B1    11/1973
(Continued)

OTHER PUBLICATIONS

Office Action dated Oct. 22, 2014 in corresponding TW application No. 101139015 (with English translation).
(Continued)

*Primary Examiner* — Dominick L Plakkoottam
*Assistant Examiner* — Melodee Jefferson
(74) *Attorney, Agent, or Firm* — Posz Law Group, P.C.

(57) ABSTRACT

A first heat exchanger, a desiccant block, and a second heat exchanger are arranged in series. In a dehumidification operation, a first operation mode in which the first heat exchanger acts as a condenser or a radiator and the second heat exchanger acts as an evaporator and a second operation mode in which the first heat exchanger acts as an evaporator and the second heat exchanger acts as a condenser or a radiator are alternately repeated.

19 Claims, 3 Drawing Sheets

(51) Int. Cl.
*F24F 11/00* (2006.01)
*B01D 53/26* (2006.01)
*B01D 53/04* (2006.01)

(52) U.S. Cl.
CPC ........ *F24F 3/1405* (2013.01); *F24F 11/0008* (2013.01); *B01D 53/0438* (2013.01); *B01D 2253/106* (2013.01); *B01D 2253/108* (2013.01); *B01D 2257/80* (2013.01); *B01D 2258/06* (2013.01)

(56) References Cited

U.S. PATENT DOCUMENTS

| | | | | | |
|---|---|---|---|---|---|
| 4,594,860 | A | * | 6/1986 | Coellner | F24F 3/1423 165/10 |
| 4,700,550 | A | * | 10/1987 | Rhodes | B01D 53/26 62/271 |
| 4,745,766 | A | * | 5/1988 | Bahr | F24F 11/085 236/44 R |
| 5,088,295 | A | * | 2/1992 | Shapiro-Baruch | F24F 1/022 62/196.4 |
| 5,353,606 | A | * | 10/1994 | Yoho | F24F 3/1423 62/271 |
| 5,579,647 | A | * | 12/1996 | Calton | F24F 3/1411 62/223 |
| 5,887,784 | A | * | 3/1999 | Haas | F24F 3/1423 236/44 A |
| 6,467,282 | B1 | * | 10/2002 | French | F25D 21/006 62/140 |
| 6,575,228 | B1 | * | 6/2003 | Ragland | F24F 3/1411 165/54 |
| 6,959,875 | B2 | * | 11/2005 | Yabu | F24F 3/1411 165/229 |
| 6,973,795 | B1 | * | 12/2005 | Moffitt | F24F 3/1423 62/132 |
| 7,165,414 | B2 | * | 1/2007 | Wright | F24F 3/153 62/277 |
| 7,287,385 | B2 | * | 10/2007 | Aldrich | B01D 53/0438 62/3.2 |
| 7,296,416 | B2 | * | 11/2007 | Akei | F25B 1/00 62/238.6 |
| 7,478,535 | B2 | * | 1/2009 | Turner, Jr. | B01D 5/0042 62/3.2 |
| 7,572,179 | B2 | * | 8/2009 | Choi | F24F 3/1411 165/54 |
| 7,886,986 | B2 | * | 2/2011 | Fischer, Jr. | F24F 3/1423 236/49.3 |
| 7,984,619 | B2 | * | 7/2011 | Matsui | F24F 3/1411 62/271 |
| 8,711,008 | B2 | * | 4/2014 | Cook | B64D 15/20 340/601 |
| 8,827,169 | B2 | * | 9/2014 | Narikawa | F24F 3/1405 165/59 |
| 9,513,065 | B2 | * | 12/2016 | Wiley | F28D 21/0014 |
| 2003/0136140 | A1 | * | 7/2003 | Maeda | F24F 3/1405 62/271 |
| 2004/0231512 | A1 | * | 11/2004 | Slayzak | B01D 47/14 95/211 |
| 2005/0011962 | A1 | * | 1/2005 | Weisenberger | F26B 21/06 236/44 A |
| 2005/0246918 | A1 | * | 11/2005 | Tanahashi | B01D 53/06 34/80 |
| 2005/0257688 | A1 | * | 11/2005 | Bae | F24F 3/1423 96/108 |
| 2005/0268634 | A1 | * | 12/2005 | Jung | F24F 3/1423 62/271 |
| 2006/0080989 | A1 | * | 4/2006 | Aoki | F25B 40/00 62/324.4 |
| 2006/0196195 | A1 | * | 9/2006 | Ikegami | B01D 53/261 62/94 |
| 2007/0214810 | A1 | * | 9/2007 | Yabu | F24F 3/1411 62/93 |
| 2007/0227718 | A1 | * | 10/2007 | Hill | B60H 1/00785 165/231 |
| 2008/0066477 | A1 | * | 3/2008 | Aoki | B60H 1/00785 62/150 |
| 2008/0156465 | A1 | * | 7/2008 | Weidmann | F24F 5/0035 165/138 |
| 2008/0173438 | A1 | * | 7/2008 | Haglid | F24F 3/1405 165/223 |
| 2009/0038326 | A1 | | 2/2009 | Matsui | |
| 2009/0044551 | A1 | * | 2/2009 | Kasahara | F25B 13/00 62/149 |
| 2010/0275775 | A1 | * | 11/2010 | Griffiths | B01D 53/0454 95/18 |
| 2010/0300123 | A1 | * | 12/2010 | Park | B01D 53/06 62/94 |
| 2011/0067426 | A1 | * | 3/2011 | Hwang | F24F 3/1411 62/271 |
| 2011/0107779 | A1 | * | 5/2011 | Kwak | F25D 21/02 62/140 |
| 2011/0185755 | A1 | * | 8/2011 | Kim | F25D 21/08 62/155 |
| 2011/0197605 | A1 | * | 8/2011 | Suzuki | B60H 1/00335 62/140 |
| 2011/0239663 | A1 | * | 10/2011 | Matsui | F24F 3/1411 62/3.3 |

FOREIGN PATENT DOCUMENTS

| | | |
|---|---|---|
| JP | 08-000944 A | 1/1996 |
| JP | 2006-150305 A | 6/2006 |
| JP | 2008-148832 A | 7/2008 |
| JP | 2009-109118 A | 5/2009 |

OTHER PUBLICATIONS

Extended European Search Report dated Jul. 14, 2015 in the corresponding European patent application No. 12844250.6.
International Search Report of the International Searching Authority dated Jan. 22, 2013 for the corresponding international application No. PCT/JP2012/076724 (and English translation).

* cited by examiner

DEHUMIDIFYING APPARATUS

CROSS REFERENCE TO RELATED APPLICATIONS

This application is a U.S. national stage application of International Application No. PCT/JP2012/076724 filed on Oct. 16, 2012 and is based on Japanese Patent Application No. 2011-236347 filed on Oct. 27, 2011, the disclosures of which are incorporated by reference.

TECHNICAL FIELD

The present invention relates to a dehumidifying apparatus.

BACKGROUND ART

Hitherto, there is the example of Patent Literature 1 as a dehumidifying apparatus which dehumidifies a dehumidified space by using adsorption and desorption by a desiccant material which adsorbs and desorbs moisture. Patent Literature 1 relates to a technology in which cooling and heating by a heat exchanger in a refrigeration cycle and adsorption and desorption by a desiccant rotor are combined to perform dehumidification, and an air passage is provided which causes air in a dehumidified space to pass through a radiator in the refrigeration cycle, a desorption portion of the desiccant rotor, an evaporator in the refrigeration cycle, and an adsorption portion of the desiccant rotor in this order.

The air in the dehumidified space introduced into the air passage is heated at the radiator, and the heated air is humidified at the desorption portion of the desiccant rotor. The humidified air is cooled to a dew-point temperature or lower to be cooled and dehumidified at the evaporator, and the cooled and dehumidified air is further dehumidified at the adsorption portion of the desiccant rotor and then is returned to the dehumidified space. By rotating the desiccant rotor, the dehumidifying operation is continuously performed.

CITATION LIST

Patent Literature

Patent Literature 1: Japanese Unexamined Patent Application Publication No. 2006-150305 (Abstract, FIG. 1)

SUMMARY OF INVENTION

Technical Problem

In the above-described existing apparatus, by combining the adsorption and desorption effects of the desiccant material and the cooling and heating effects of the refrigeration cycle, it is possible to achieve a more amount of dehumidification as compared to dehumidification using only a refrigeration cycle or a desiccant material, and a high-performance dehumidifying apparatus is made. However, the following problems arise.

Since the desiccant rotor is used, a driving portion for the rotor is needed. In addition, in order to prevent air leak from occurring between the adsorption portion and the desorption portion of the desiccant, a seal structure is needed which hermetically separates the adsorption portion and the desorption portion from each other at a boundary portion therebetween. Thus, the size of the apparatus is increased, and the cost is increased. Moreover, since the air passage is configured to return air having passed through the desiccant rotor, to the desiccant rotor again, the air passage has many bent portions, pressure loss is increased when the air is conveyed, the power for a fan is increased, and the power consumption of the apparatus is increased.

The present invention has been made in order to solve the above-described problems, and an object of the present invention is to realize a dehumidifying apparatus which has high dehumidification capability but allows a desiccant rotor driving portion and a seal structure at a boundary portion between an adsorption portion and a desorption portion to be made unnecessary to simplify the apparatus, and thus is allowed to be compacted and decreased in cost.

Solution to Problem

A dehumidifying apparatus according to the present invention includes: a refrigerant circuit in which a compressor, a flow path switching device, a first heat exchanger, a pressure reducing device, and a second heat exchanger are connected to each other in this order by a refrigerant pipe; an air passage in which the first heat exchanger, a desiccant material which is capable of adsorbing and desorbing moisture, and the second heat exchanger are arranged in series; and an air-sending device provided within the air passage and configured to send air within a dehumidified space into the air passage. A dehumidification operation is performed in which a first operation mode and a second operation mode are alternately switched by flow path switching of the flow path switching device, the first operation mode being a mode in which the first heat exchanger acts as a condenser or a radiator, the second heat exchanger acts as an evaporator, and moisture retained in the desiccant material is desorbed, the second operation mode being a mode in which the first heat exchanger acts as an evaporator, the second heat exchanger acts as a condenser or a radiator, and the desiccant material adsorbs moisture from air passing through the air passage.

Advantageous Effects of Invention

According to the present invention, it is possible to perform dehumidification with a high amount of dehumidification by combining adsorption and desorption effects of the desiccant material and cooling and heating effects by an operation of a refrigeration cycle of the refrigerant circuit. In addition, since the air passage is configured in which the first heat exchanger, the desiccant material, and the second heat exchanger are arranged in series, and the dehumidification is performed such that the first operation mode in which the first heat exchanger acts as a condenser or a radiator, the second heat exchanger as an evaporator, the moisture retained in the desiccant material is desorbed and the second operation mode in which the first heat exchanger acts as an evaporator, the second heat exchanger acts as a condenser or a radiator, and the desiccant material adsorbs moisture from air passing through the air passage are alternately switched by flow path switching of the flow path switching device, it is possible to simplify the structure of the apparatus, and it is possible to obtain a more compact and low-cost apparatus.

DESCRIPTION OF EMBODIMENTS

Embodiment 1

Figure 1:
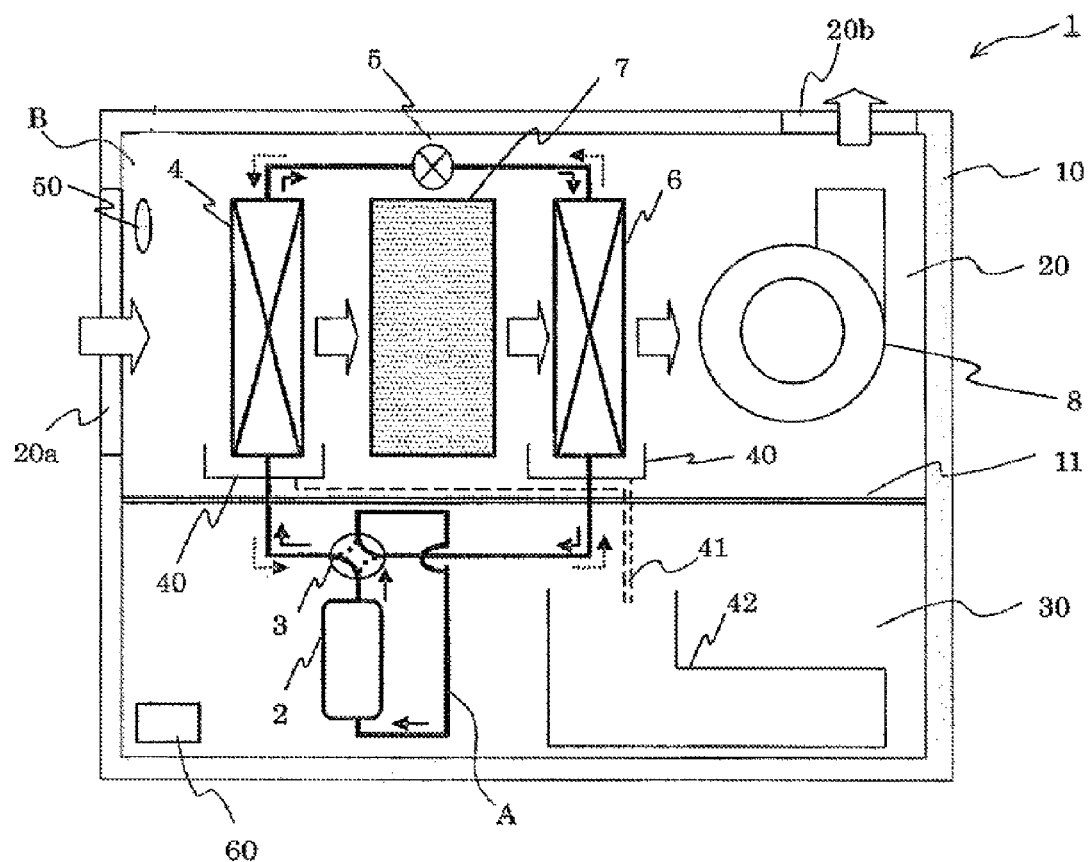
FIG. 1 is a diagram showing the configuration of a dehumidifying apparatus according to Embodiment 1 of the present invention.

FIG. 1 is a diagram showing the configuration of a dehumidifying apparatus according to Embodiment 1 of the present invention. In FIG. 1 and each diagram described later, portions designated by the same reference signs are the same or equivalent portions, and this is common throughout the specification. In addition, constituent elements described in the specification are merely illustrative and not limited to these descriptions.

The dehumidifying apparatus 1 includes, in a housing 10, a compressor 2, a four-way valve 3 which is a flow path switching device, a first heat exchanger 4, an expansion valve 5, which is a pressure reducing device, and a second heat exchanger 6, and these components are annularly connected to each other by refrigerant pipes to form a refrigerant circuit A. The inside of the housing 10 is divided into an air passage chamber 20 and a machine chamber 30, the compressor 2 and the four-way valve 3 are disposed in the machine chamber 30, and the other components are disposed in the air passage chamber 20. It should be noted that through holes (not shown) are formed in a wall surface 11 which partitions the machine chamber 30 and the air passage chamber 20, and the refrigerant pipes are passed through the through holes (not shown) to connect the components to each other. In addition, in order to prevent airflow from occurring between the machine chamber 30 and the air passage chamber 20 via a gap between the through hole and the connection pipe, the gap portion may be kept hermetic.

The four-way valve 3 switches a flow path such that a refrigerant flows in a solid line direction or a dotted line direction in FIG. 1. When the flow path is switched to the flow path of the solid line in FIG. 1, a refrigeration cycle is configured in which the refrigerant discharged from the compressor 2 flows through the four-way valve 3, the first heat exchanger 4, the expansion valve 5, the second heat exchanger 6, and the four-way valve 3 in this order and returns to the compressor 2. In this configuration, the first heat exchanger 4 acts as a condenser (radiator), and the second heat exchanger 6 acts as an evaporator.

On the other hand, when the flow path of the four-way valve 3 is switched to the flow path of the dotted line in FIG. 1, a refrigeration cycle is configured in which the refrigerant discharged from the compressor 2 flows through the compressor 2, the four-way valve 3, the second heat exchanger 6, the expansion valve 5, the first heat exchanger 4, and the four-way valve 3 in this order and returns to the compressor 2. In this configuration, the second heat exchanger 6 acts as a condenser (radiator), and the first heat exchanger 4 acts as an evaporator. For example, R410A is used as the refrigerant of the dehumidifying apparatus 1. It should be noted that the refrigerant is not limited to R410A, another HFC-based refrigerant, an HC refrigerant, or a natural refrigerant such as $CO_2$, $NH_3$, or the like may be used. In the case where a $CO_2$ refrigerant is used, during operation in which a high-pressure pressure is equal to or higher than a critical pressure, the condenser acts as a radiator.

Each of the first heat exchanger 4 and the second heat exchanger 6 is a plate fin tube heat exchanger and is configured to exchange heat between the refrigerant flowing through a heat-transfer pipe and air flowing around a fin. The expansion valve 5 is a valve whose opening degree is fixed, and reduces the pressure of the refrigerant passing therethrough, to expand the refrigerant.

The air passage chamber 20 has an air inlet 20a through which a dehumidification target air is introduced into the inside and an air outlet 20b through which dehumidified air is discharged to the outside, and air conveyed by a fan 8 as an air-sending device flows in the direction of an outline arrow in FIG. 1. The air passage chamber 20 is formed in a rectangular shape. In the air passage chamber 20, an air passage B is formed in which the first heat exchanger 4, a desiccant block 7 which is a desiccant material, the second heat exchanger 6, and the fan 8 are arranged in series. Thus, air sucked through the air inlet 20a into the air passage B linearly flows through the first heat exchanger 4, the desiccant block 7 which is the desiccant material, the second heat exchanger 6, and the fan 8 in this order in the air passage B and then is discharged through the air outlet 20b to the outside of the dehumidifying apparatus 1.

The desiccant block 7 is obtained by forming a desiccant material in the solid form into a rectangular shape and is formed from a material that adsorbs and desorbs moisture, and, for example, zeolite, silica gel, a polymeric adsorbent, or the like is used.

In addition, in the air passage chamber 20, a drain pan 40 is disposed below each of the first heat exchanger 4 and the second heat exchanger 6 and receives drain water which is generated during operation and drops from each heat exchanger. The drain water received by each drain pan 40 flows via a water path 41 indicated by a wavy line in FIG. 1 into a drain tank 42 located at the lowermost portion of the dehumidifying apparatus 1 and is stored therein.

The air passage chamber 20 further includes a temperature and humidity sensor 50 which measures the temperature and humidity of suction air of the dehumidifying apparatus 1 (the temperature and humidity around the dehumidifying apparatus 1).

In addition, within the dehumidifying apparatus 1, a controller 60 which controls the entirety of the dehumidifying apparatus 1 is further provided at the machine chamber 30 side. The controller 60 is composed of a microcomputer and includes a CPU, a RAM, a ROM, and the like, and a control program is stored in the ROM. The controller 60 performs various control such as control of a later-described dehumidification operation (switching of the four-way valve 3 in accordance with detection signals of the temperature and humidity sensor 50, etc.), control of a rotation speed of the fan 8, control of a rotation speed of the compressor 2, and control of the opening degree of the expansion valve 5.

Next, action of the dehumidification operation of the dehumidifying apparatus 1 will be described. In the dehumidifying apparatus 1, two operation modes are achieved by flow path switching of the four-way valve 3. The two operation modes will be sequentially described below.

(First Operation Mode: Operation of Refrigeration Cycle)

First, an operation in a first operation mode which is the case where the flow path of the four-way valve 3 is switched to the solid line in FIG. 1 will be described. An operation of the refrigeration cycle in the first operation mode is as follows. After a low-pressure gas is sucked by the compressor 2, the gas is compressed into a high-temperature and high-pressure gas. The refrigerant discharged from the compressor 2 flows via the four-way valve 3 into the first heat exchanger 4. The refrigerant having flowed into the first heat exchanger 4 transfers heat to air flowing through the air passage B. While heating the air, the refrigerant itself is cooled to condense into a high-pressure liquid refrigerant and flows out from the first heat exchanger 4. The liquid refrigerant having flowed out from the first heat exchanger 4 is reduced in pressure by the expansion valve 5 to be a low-pressure two-phase refrigerant. Then, the refrigerant flows into the second heat exchanger 6, receives heat from the air flowing through the air passage B. While cooling the air, the refrigerant itself is heated to evaporate into a low-pressure gas. Then, the refrigerant is sucked via the four-way valve 3 into the compressor 2.

(First Operation Mode: Action of Air)

Figure 2:
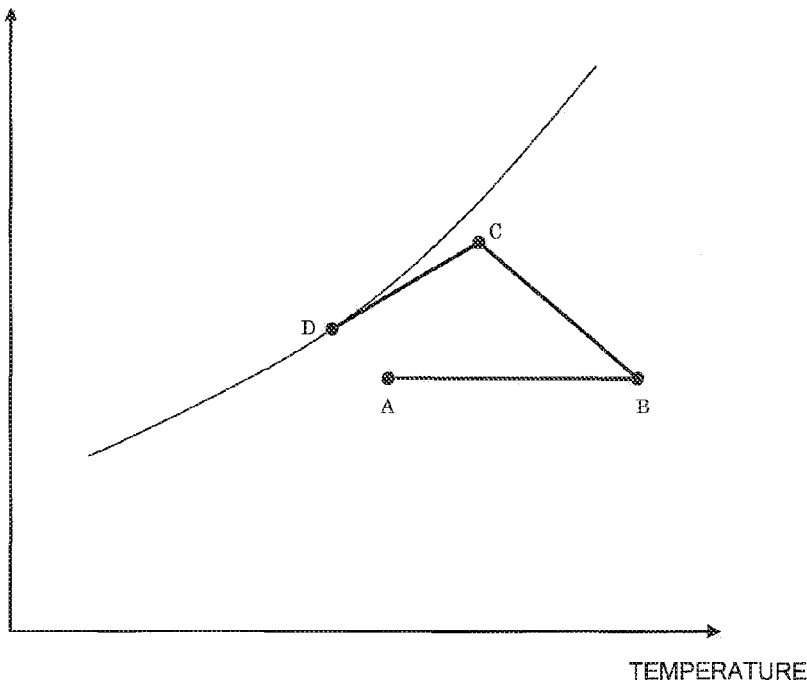
FIG. 2 is an air moisture diagram showing a change in state of air during a first operation mode.

Next, action of air in the first operation mode will be described with reference to FIG. 2. FIG. 2 is an air moisture diagram showing a change in state of air during the first operation mode, the vertical axis indicates the absolute humidity of air, and the horizontal axis indicates the dry-bulb temperature of air. In addition, a curved line in FIG. 2 indicates saturated air, and the relative humidity in saturated air is 100%.

The air around the dehumidifying apparatus 1 (FIG. 2, point A) flows into the dehumidifying apparatus 1 and then is heated at the first heat exchanger 4, so that its temperature rises and its relative humidity lowers (FIG. 2, point B). Then, the air flows into the desiccant block 7. Since the relative humidity of the air is low, the moisture retained in the desiccant block 7 is desorbed (released), and the amount of moisture contained in the air increases. Meanwhile, desorption heat associated with the desorption is taken away from the air having flowed into the desiccant block 7, the temperature of the air lowers, and the air becomes a low-temperature and high-humidity state (FIG. 2, point C). Then, the air flows into the second heat exchanger 6 and is cooled. It should be noted that the refrigerant circuit A is operated such that the temperature of the refrigerant within the second heat exchanger 6 is lower than the dew-point temperature of the air, and the air is cooled and dehumidified by the second heat exchanger 6 to become a low-temperature and low-absolute-humidity state (FIG. 2, point D). Then, the air flows into the fan 8 and is discharged through the air outlet 20b to the outside of the dehumidifying apparatus 1.

(Second Operation Mode: Operation of Refrigeration Cycle)

Next, an operation in a second operation mode which is the case where the flow path of the four-way valve 3 is switched to the dotted line in FIG. 1 will be described. The operation of the refrigeration cycle in the second operation mode is as follows. After a low-pressure gas is sucked by the compressor 2, the gas is compressed into a high-temperature high-pressure gas. The refrigerant discharged from the compressor 2 flows via the four-way valve 3 into the second heat exchanger 6. The refrigerant having flowed into the second heat exchanger 6 transfers heat to the air flowing through the air passage B. While heating the air, the refrigerant itself is cooled to condense into a high-pressure liquid refrigerant and flows out from the second heat exchanger 6. The liquid refrigerant having flowed out from the second heat exchanger 6 is reduced in pressure at the expansion valve 5 to be a low-pressure two-phase refrigerant. Then, the refrigerant flows into the first heat exchanger 4, receives heat from the air flowing through the air passage B. While cooling the air, the refrigerant itself is heated to evaporate into a low-pressure gas. Then, the refrigerant is sucked via the four-way valve 3 into the compressor 2.

(Second Operation Mode: Action of Air)

Figure 3:
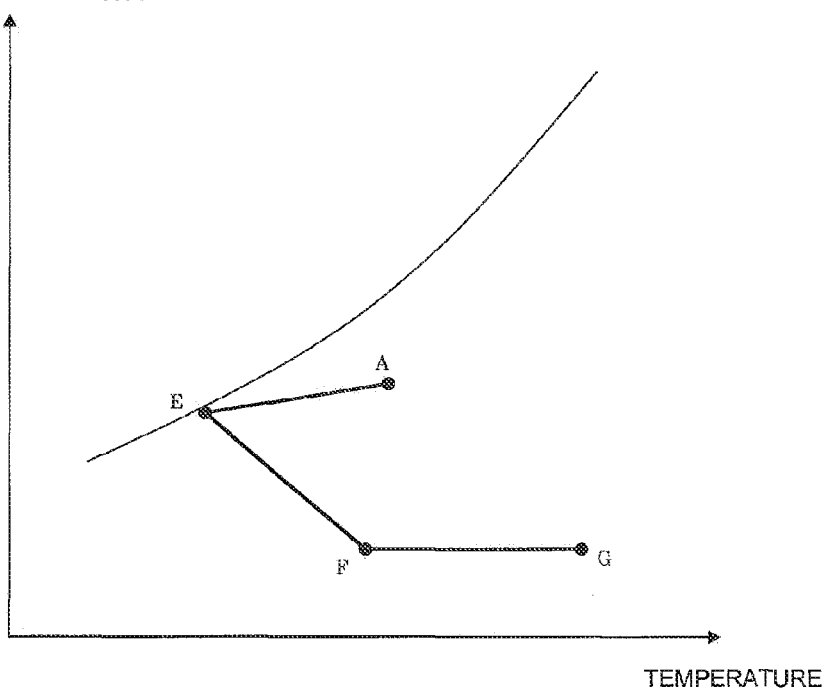
FIG. 3 is an air moisture diagram showing a change in state of air during a second operation mode.

Next, action of air in the second operation mode will be described with reference to FIG. 3. FIG. 3 is an air moisture diagram showing a change in state of air during the second operation mode, the vertical axis indicates the absolute humidity of air, and the horizontal axis indicates the dry-bulb temperature of air. In addition, a curved line in FIG. 3 indicates saturated air, and the relative humidity in saturated air is 100%.

The air around the dehumidifying apparatus 1 (FIG. 3, point A) flows into the dehumidifying apparatus 1 and then is cooled at the first heat exchanger 4. It should be noted that the refrigerant circuit A is operated such that the temperature of the refrigerant within the first heat exchanger 4 is lower than the dew-point temperature of the air, and the air is cooled and dehumidified by the first heat exchanger 4 to become a low-temperature and high-relative-humidity state (FIG. 3, point E). Then, the air flows into the desiccant block 7. Since the relative humidity of the air is high, the moisture in the air is adsorbed by the desiccant block 7, the amount of moisture contained in the air decreases, and the air is further dehumidified. Meanwhile, the air having flowed into the desiccant block 7 is heated by adsorption heat generated with the adsorption, the temperature of the air rises, and the air becomes a high-temperature and low-humidity state (FIG. 3, point F). Then, the air flows into the second heat exchanger 6 and is heated to have a high temperature (FIG. 3, point G). Then, the air flows into the fan 8 and is discharged through the air outlet 20b to the outside of the dehumidifying apparatus 1.

As described above, in the second operation mode, in addition to the dehumidification by cooling with the refrigerant at the first heat exchanger 4, the dehumidification by the adsorption of the desiccant block 7 is also performed. Thus, as is obvious from comparison between FIG. 2 and FIG. 3, the second operation mode allows a more amount of dehumidification to be ensured than in the first operation mode, and main dehumidification in the dehumidifying apparatus 1 is performed in the second operation mode.

In the dehumidifying apparatus 1 of Embodiment 1, the first and second operation modes are alternately repeated. For example, when the second operation mode is continuously executed, since there is an upper limit to the amount of moisture contained in the desiccant block 7, if the second operation mode continues for a certain period of time or longer, moisture is no longer adsorbed by the desiccant block 7, and the amount of dehumidification lowers. Thus, at the time when the amount of moisture retained in the desiccant block 7 gets close to the upper limit, the mode is switched to the first operation mode, and operation of releasing moisture from the desiccant block 7 is performed. At the time when the first operation mode is executed for a while and the amount of moisture retained in the desiccant block 7 is appropriately decreased, the mode is switched to the second operation mode. By alternately executing the first and second operation modes as described above, the adsorption and desorption effects of the desiccant block 7 are sequentially exerted, and the effect of increasing the amount of dehumidification by the adsorption and desorption effects of the desiccant is maintained.

As described above, in Embodiment 1, to configure the high-performance dehumidifying apparatus 1 by combining the adsorption and desorption effects of the desiccant material and the heating and cooling effects of the refrigeration cycle, the air passage B is linearly formed. Since the existing apparatus has a configuration using a desiccant rotor, it is necessary to send air to the adsorption portion and the desorption portion of the desiccant rotor, an air passage having bent portions has to be formed, and thus pressure loss is increased when the air is conveyed. In contrast, in Embodiment 1, since the air passage B is linearly formed, it is possible to reduce pressure loss when air is conveyed. Thus, it is possible to reduce the power consumption of the fan 8 which conveys air, and it is possible to make an apparatus with higher efficiency.

In addition, in the existing configuration using a desiccant rotor, a motor for rotationally driving the desiccant rotor, its fixing structure, and the like are needed, and the apparatus configuration is complicated. In contrast, in Embodiment 1, the apparatus is of a stationary type, thus a motor for rotationally driving the desiccant material is unnecessary, and the air passage configuration is simple. Therefore, it is possible to make the apparatus compact, it is possible to simplify the apparatus configuration, and it is possible to make a low-cost apparatus.

In addition, in Embodiment 1, the air passage B is formed in a rectangular shape. Thus, when each of the first heat exchanger 4, the second heat exchanger 6, and the desiccant block 7 which are mounted in the air passage B is configured to have a rectangular outer shape corresponding to the shape of the air passage B, it is possible to more densely mount these components within the rectangular air passage B.

In other words, in the existing apparatus, since a desiccant rotor is used, a circular rotor is arranged in the rectangular air passage B. Thus, dead spaces are formed at the four corners at a portion where the rotor is arranged, and hence it is impossible to make the air passage compact. In contrast, in Embodiment 1, since the rectangular desiccant block 7 is used, it is possible to arrange the desiccant block 7 without dead spaces, and hence high-density mounting is possible. As a result, it is possible to make the air passage B compact (the air passage chamber 20 compact).

In addition, in the existing apparatus, it is necessary to divide the air passage into portions for the adsorption portion and the desorption portion, and thus a seal structure is needed which hermetically separates the adsorption portion and the desorption portion from each other at the boundary portion therebetween. In contrast, in Embodiment 1, since there is one air passage B and it is possible to switch between the adsorption and desorption of the desiccant block 7 by switching of the four-way valve 3, the seal structure in the related art is unnecessary, it is possible to simplify the apparatus configuration, and it is possible to reduce the cost.

It should be noted that when each of the first heat exchanger 4, the second heat exchanger 6, and the desiccant block 7 which are mounted in the air passage B is configured to have a rectangular outer shape corresponding to the shape of the air passage B as described above, this is preferred since the effect of compactification is obtained as described above, but the outer shape is not necessarily limited to the rectangular shape.

In addition, in the second operation mode of the embodiment, the conveyed air is dehumidified by the first heat exchanger 4, dehumidified by the desiccant block 7, and then heated by the second heat exchanger 6. Thus, air blown out from the dehumidifying apparatus 1 becomes a high-temperature state with a low amount of moisture (FIG. 3 point G), and it is possible to make the relative humidity equal to or lower than 20%. Such low-relative-humidity air is air suitable for drying, and when this air is applied directly to materials to be dried such as laundry, it is possible to promote drying of the materials to be dried, and it is possible to achieve a higher-performance drying function.

It should be noted that the air blown out in the first operation mode has a low temperature and a high humidity as compared to air blown out in the second operation mode. Thus, when the dehumidifying apparatus 1 is used for drying materials to be dried, it is desirable to apply the blown-out air to the materials to be dried only during the second operation mode. Thus, in order to adapt to such usage, a vane which is able to change the direction of the air to be blown out may be provided at the air outlet 20b of the dehumidifying apparatus 1 such that a blown-out direction in the first operation mode and a blown-out direction in the second operation mode are allowed to be adjusted to different directions. The vane may be adjusted such that air blown out from the air outlet 20b is applied to materials to be dried only during the second operation mode. Thus, it is possible to further promote drying of the materials to be dried, and it is possible to achieve a high-performance drying function.

It should be noted that the configuration of the dehumidifying apparatus of the present invention is not limited to the above configuration, and various modifications can be made, for example, as follows without departing from the scope of the present invention.

(Modification 1: Constituent Elements of Dehumidifying Apparatus 1)

FIG. 1 shows the configuration using the four-way valve 3 for switching the refrigerant circuit A. However, the configuration is not particularly limited to the four-way valve as long as it is possible to switch the flow path of the refrigerant circuit A, and another valve may be used. For example, four solenoid valves which are two-way valves may be used and arranged at portions connecting the discharge side and the suction side of the compressor 2 to the first heat exchanger 4 and at portions connecting the discharge side and the suction side of the compressor 2 to the first heat exchanger 4. A refrigerant circuit A and a refrigeration cycle which are the same as those of the embodiment may be achieved by opening/closing of each solenoid valve. In addition, other pressure reducing means may be used instead of the expansion valve 5. For example, a capillary tube or an electronic expansion valve having a variable opening degree, etc. may be used.

(Modification 2: Operation Time of Each Operation Mode)

An operation time of each of the first operation mode and the second operation mode may be a predetermine time. However, for the operation time of each operation mode, there is an appropriate value corresponding to an air condition or an operating state of the dehumidifying apparatus 1. Thus, in order to enable the dehumidifying apparatus 1 to operate with the appropriate value, the operation time of each operation mode may be determined on the basis of the air condition or the operating state of the dehumidifying apparatus 1.

In the first operation mode, moisture is released from the desiccant block 7, and thus a time taken until an appropriate amount of moisture is released from the desiccant block 7 and the amount of moisture remaining in the desiccant block 7 becomes an appropriate amount is an appropriate value. When the first operation mode ends to switch to the second operation mode in a state where the amount of moisture remaining in the desiccant block 7 is larger than the appropriate amount, the amount of moisture which can be adsorbed by the desiccant block 7 in the second operation mode is bounded, and the amount of dehumidification in the second operation mode is reduced. On the other hand, when the time of the first operation mode is excessively lengthened, a state where almost no moisture can be desorbed from the desiccant block 7 continues in the latter half of the first operation mode, and switching to the second operation mode which achieves a higher amount of dehumidification than the first operation mode is delayed. Thus, in this case as well, the total amount of dehumidification is reduced.

In the second operation mode, moisture is adsorbed by the desiccant block 7, and thus a time taken until the amount of moisture adsorbed by the desiccant block 7 becomes an appropriate amount is an appropriate value. When the operation is switched to the first operation mode even if further adsorption is still possible by the desiccant block 7, the operation time of the second operation mode in which the amount of dehumidification is high as compared to that in the first operation mode is shortened, and the total amount of dehumidification is reduced. On the other hand, when the time of the second operation mode is excessively lengthened, a state where adsorption by the desiccant block 7 is impossible continues in the latter half of the second operation mode. In this case as well, the amount of dehumidification is reduced.

A change in the amount of moisture retained in the desiccant block 7 is determined on the basis of the relative humidity of air flowing into the desiccant block 7. When high-relative-humidity air flows into the desiccant block 7, the moisture within the desiccant block 7 is unlikely to be released, and reversely, the amount of moisture adsorbed by the desiccant block 7 increases. When low-relative-humidity air flows into the desiccant block 7, the moisture within the desiccant block 7 is likely to be released, and reversely, the amount of moisture adsorbed by the desiccant block 7 decreases.

In view of the above points, the operation time of each operation mode may be determined by the following Determining Method 1 or Determining Method 2. Incidentally, during the dehumidification operation, a cycle of the first operation mode and the second operation mode is repeated as one cycle, and the time of one cycle (i.e., the total time of the operation time of the first operation mode and the operation time of the second operation mode) is always constant. Thus, in the determining methods described below, time distribution of each of the first operation mode and the second operation mode within one cycle is determined. It should be noted that determination of each operation time is performed at the time of start of the dehumidification operation. Each determination pattern will be sequentially described below.

(Determining Method 1)

The relative humidity of suction air is obtained from a state of the suction air obtained by the temperature and humidity sensor 50, and the operation time of each operation mode is determined in accordance with the relative humidity. This method will be specifically described below.

A relative humidity which is a reference for the suction air (hereinafter, referred to as reference relative humidity) is previously determined, and a reference operation time for each operation mode which allows the amount of dehumidification to be high when suction air having the reference relative humidity passes through the air passage B is previously obtained by an experiment, simulation, or the like. Then, in accordance with a magnitude relationship between the relative humidity of actual suction air and the reference relative humidity, the operation time of each operation mode is determined by being appropriately increased or decreased from the reference operation time for each operation mode as described below.

The relative humidity of actual suction air is obtained from a state of the suction air obtained by the temperature and humidity sensor 50 at the time of start of the dehumidification operation. When the relative humidity is higher than a preset relative humidity, the amount of moisture released from the desiccant block 7 in the first operation mode is smaller than the amount of moisture released when the relative humidity is the reference relative humidity, and the amount of moisture adsorbed by the desiccant block 7 in the second operation mode is larger than the amount of moisture adsorbed when the relative humidity is the reference relative humidity. Thus, when the relative humidity of the actual suction air is higher than the reference relative humidity, the operation time of the first operation mode is made longer than the reference operation time for the first operation mode, and reversely, the operation time of the second operation mode is made shorter than the reference operation time for the second operation mode.

On the other hand, when the relative humidity of the actual suction air is lower than the reference relative humidity, the amount of moisture released from the desiccant block 7 in the first operation mode is larger than the amount of moisture released when the relative humidity is the reference relative humidity, and the amount of moisture adsorbed by the desiccant block 7 in the second operation mode is smaller than the amount of moisture adsorbed when the relative humidity is the reference relative humidity. Thus, when the relative humidity of the actual suction air is lower than the reference relative humidity, the operation time of the first operation mode is made shorter than the reference operation time for the first operation mode, and reversely, the operation time of the second operation mode is made longer than the reference operation time for the second operation mode.

By adjusting the operation time of each operation mode as described above, it is made possible to appropriately adjust the amount of moisture retained in the desiccant block 7, and it is possible to always achieve a high amount of dehumidification even when the state of the suction air is any state. It should be noted that when the relative humidity of the actual suction air is the same as the reference relative humidity, as a matter of course, it is only necessary to operate with the reference operation time for each operation mode.

(Determining Method 2)

The operation time of each operation mode is determined in accordance with an operating state of the refrigerant circuit A at the time of start of the dehumidification operation. This method will be specifically described below.

The operating state of the refrigerant circuit A varies depending on the state of suction air. Specifically, when the relative humidity of the suction air is high, the difference in the humidity of air before and after passing through the heat exchanger serving as an evaporator in each operation mode is increased as compared to the case where the relative humidity of the suction air is low. In other words, heat exchange between the refrigerant and the air at the evaporator is promoted, and thus operation is performed in which the low-pressure pressure in the refrigeration cycle is increased accordingly. On the other hand, when the relative humidity of the suction air is low, the heat exchange between the refrigerant and the air at the evaporator is suppressed, and thus operation is performed in which the low-pressure pressure in the refrigeration cycle is decreased.

Since the low-pressure pressure in the refrigeration cycle and the relative humidity of the suction air have the above relationship, when this relationship is applied to the above Determining Method 1, it is possible to determine the operation time of each of the first and second operation modes in accordance with the low-pressure pressure in the refrigeration cycle. It should be noted that the high-pressure pressure also increases in response to the increase in the low-pressure pressure in the refrigeration cycle, and thus eventually it is possible to determine the operation time of each of the first operation mode and the second operation mode in accordance with the low-pressure pressure or the high-pressure pressure in the refrigeration cycle.

In other words, at the time of start of the dehumidification operation, the low-pressure pressure (or the high-pressure pressure) in the refrigeration cycle is measured, and the measured low-pressure pressure value (or measured high-pressure pressure value) obtained by the measurement is compared to a predetermined low-pressure pressure reference value (or high-pressure pressure reference value). When the measured low-pressure pressure value (or measured high-pressure pressure value) is higher than the low-pressure pressure reference value (or high-pressure pressure reference value), it is determined that the relative humidity of the suction air is high, similarly to the above Determining Method 1, the operation time of the first operation mode is made longer than its reference operation time, and reversely, the operation time of the second operation mode is made shorter than its reference operation time.

On the other hand, when the measured low-pressure pressure value (or measured high-pressure pressure value) is lower than the low-pressure pressure reference value (or high-pressure pressure reference value), it is determined that the relative humidity of the suction air is low, similarly to the above Determining Method 1, the operation time of the first operation mode is made shorter than its reference operation time, and reversely, the operation time of the second operation mode is made longer than its reference operation time.

It should be noted that for the measurement of the low-pressure pressure and the high-pressure pressure, pressure sensors may be provided at a low-pressure portion and a high-pressure portion in the refrigeration cycle, the temperature of the refrigerant in each heat exchanger which is a two-phase gas-liquid portion in the refrigeration cycle may be measured and the low-pressure pressure may be estimated from the temperature.

As described above, similarly to the above Determining Method 1 (the method based on information of the suction air), it is possible to appropriately adjust the amount of moisture retained in the desiccant block 7, even with the low-pressure pressure or the high-pressure pressure in the refrigeration cycle. In addition, even when the state of the suction air is any state, it is possible to always achieve a high amount of dehumidification.

(Operation Switching at Time of Frost)

Incidentally, when the temperature of suction air is low, if the second operation mode is executed, low-temperature air is cooled at the first heat exchanger 4. Thus, when the temperature at the fin surface of the first heat exchanger 4 becomes equal to or less than 0 degrees C., frost occurs on the fin surface. When operation is continued in this state, the frost grows to block an airflow path between fins. As a result, the amount of sent air is decreased, and the dehumidifying apparatus 1 falls in a situation where operation thereof is not able to be appropriately executed.

Thus, when, during the second operation mode, it is inferred due to the operating state of the refrigerant circuit A that frost has occurred in the first heat exchanger 4, even before end of the preset operation time (or before end of the operation time determined by the above Determining Method 1 or Determining Method 2), the second operation mode may be ended to switch to the first operation mode. It should be noted that in the first operation mode, since the first heat exchanger 4 acts as a condenser, the pressure and temperature of the refrigerant are high, and thus it is possible to melt the frost by heating.

It is possible to determine the frost state on the basis of the low-pressure pressure in the refrigeration cycle. For example, when a period when the low-pressure pressure is lower than a predetermined value has lasted for a certain period or longer during operation in the second operation mode, it is determined that a state where the temperature at the fin surface of the first heat exchanger 4 is equal to or lower than 0 degrees C. has continued for a long period of time and frost has progressed. In this case, as described above, the second operation mode is ended to switch to the first operation mode. It should be noted that as the method for measuring the low-pressure pressure, similarly to the above means, a pressure sensor may be provided at the low-pressure portion in the refrigeration cycle, or the temperature of the refrigerant in the first heat exchanger 4 which is a low-pressure two-phase gas-liquid portion may be measured.

It should be noted that the determination of the frost state is not limited to the above method. The temperature at the fin surface of the first heat exchanger 4 may be measured, and when the temperatures is equal to or lower than 0 degrees C. and operation has continued for a certain period of time or longer, it may be determined as being in a frost state.

When the mode is switched to the first operation mode if it is determined in the second operation mode that it is in a frost state as described above, operation is prevented from being performed while the frost state progresses, and it is possible to avoid a decrease in the amount of dehumidification caused by a decrease in the amount of sent air and to achieve a dehumidifying apparatus 1 with higher reliability.

Embodiment 2

Figure 4:
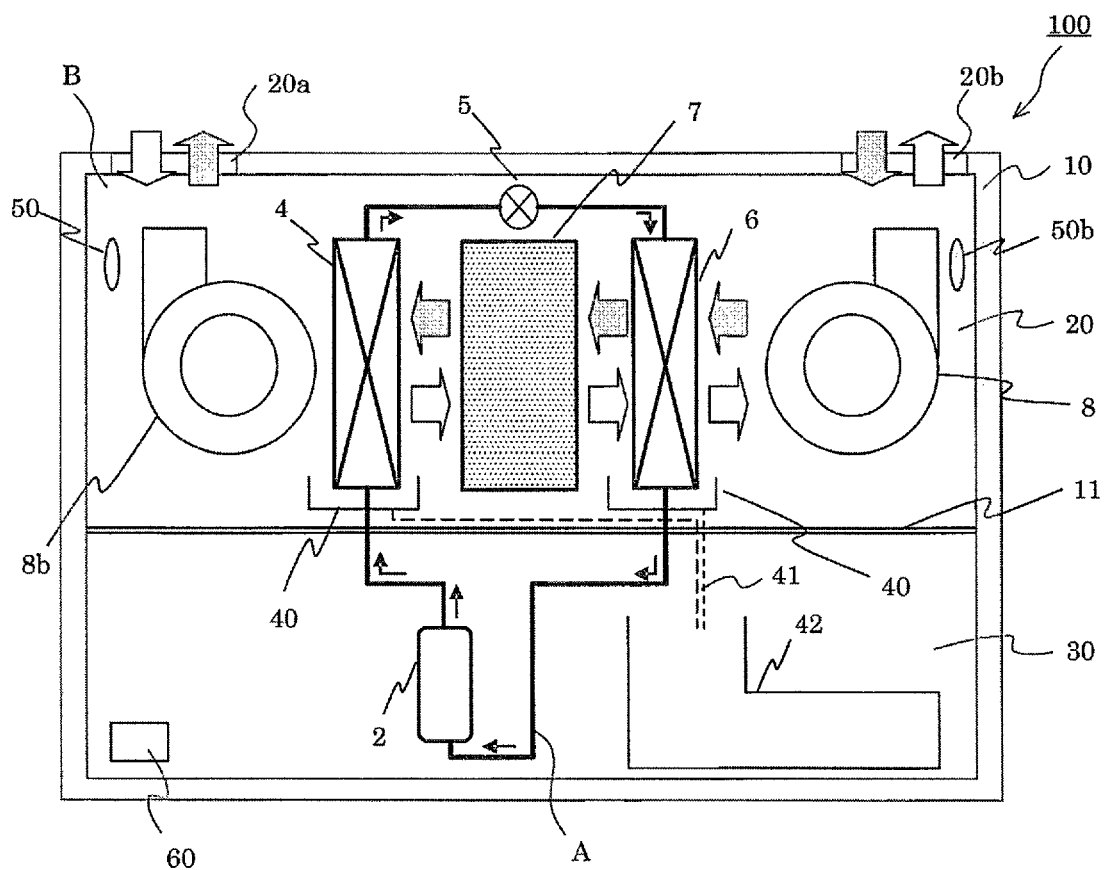
FIG. 4 is a diagram showing the configuration of a dehumidifying apparatus according to Embodiment 2 of the present invention.

FIG. 4 is a diagram showing the configuration of a dehumidifying apparatus according to Embodiment 2 of the present invention. The difference of Embodiment 2 from Embodiment 1 will be mainly described below. It should be noted that a modification applied to the same configuration portion as in Embodiment 1 is also similarly applied to Embodiment 2.

The dehumidifying apparatus 100 according to Embodiment 2 has a configuration in which the four-way valve 3 is removed from the dehumidifying apparatus 1 according to Embodiment 1 shown in FIG. 1 and the direction of flow of the refrigerant in the refrigerant circuit A is limited to the direction of a solid line arrow in FIG. 4. In addition, a fan 8b is provided between the air inlet 20a and the first heat exchanger 4. It should be noted that in Embodiment 2, the air inlet 20a becomes an air inlet/outlet 20a used not only for suction but also for blowout, and the air outlet 20b becomes an air inlet/outlet 20b used not only for blowout but also for suction. The dehumidifying apparatus 100 further includes a temperature and humidity sensor 50b which measures the temperature and humidity of air flowing in from the air inlet/outlet 20b (the temperature and humidity around the dehumidifying apparatus 100), but may include only either one of the temperature and humidity sensor 50 or the temperature and humidity sensor 50b. The point is that it is only necessary to be able to detect the temperature and humidity of suction air of the dehumidifying apparatus 100.

The fan 8 and the fan 8b do not operate at the same time, and either one of these fans is operated at a time. When the fan 8 is operated, air flows in an outline arrow direction from left to right in FIG. 4 (a first direction) similarly to FIG. 1.

When the fan 8*b* is operated, air flows in a gray arrow direction from right to left in FIG. 4 (a second direction). It should be noted that the two fans are shown as air-sending devices causing air to flow in the outline arrow direction or the gray arrow direction, but a single fan may be provided which is rotatable in a forward direction and in a reverse direction and is able to send air in both the outline arrow direction and the gray arrow direction.

In Embodiment 2, the first heat exchanger 4 always acts as a condenser and heats air that flows into the first heat exchanger 4. In addition, the second heat exchanger 6 always acts as an evaporator and cools and dehumidifies air that flows into the second heat exchanger 6.

Next, an operation in Embodiment 2 will be described. In Embodiment 2, a third operation mode in which the fan 8 is operated to cause air to flow in the outline arrow direction and a fourth operation mode in which the fan 8*b* is operated to cause air to flow in the gray arrow direction are provided, and dehumidification is performed while switching each operation mode. An operation in the third operation mode is the same as that in the first operation mode in Embodiment 1. In the third operation mode, after air that has flowed through the air inlet/outlet 20*a* into the air passage B is heated at the first heat exchanger 4 to have a low relative humidity, the air desorbs moisture retained in the desiccant block 7, then flows into the second heat exchanger 6, and is cooled and dehumidified there. Thereafter, the air is blown out through the air inlet/outlet 20*b* to the outside of the dehumidifying apparatus 100.

On the other hand, in the fourth operation mode, air that has flowed through the air inlet/outlet 20*b* into the air passage B is cooled and dehumidified at the second heat exchanger 6 to have a high relative humidity, and is further dehumidified by its moisture being adsorbed by the desiccant block 7. Thereafter, the air is heated at the first heat exchanger 4 and blown out through the air inlet/outlet 20*a* to the outside of the dehumidifying apparatus 100. As described above, the fourth operation mode is different from Embodiment 1 in the operation of the refrigeration cycle of the refrigerant circuit A, but is the same as the second operation mode according to Embodiment 1 in change in the state of the air within the air passage B.

In the dehumidifying apparatus 100 according to Embodiment 2, the third and fourth operation modes are alternately repeated. Thus, change in the state of the air within the desiccant block 7 and the dehumidifying apparatus 100 is the same as that when the first and second operation modes are alternately executed in Embodiment 1.

It should be noted that a method for determining an operation time of each of the third and fourth operation modes is the same as that in Embodiment 1. In other words, the operation time of the third operation mode is determined similarly to the operation time of the first operation mode in Embodiment 1, and the operation time of the fourth operation mode is determined similarly to the operation time of the second operation mode in Embodiment 1. It should be noted that the relative humidity of suction air at the time of start of dehumidification may be obtained from a state of the suction air obtained by the temperature and humidity sensor 50 or the temperature and humidity sensor 50*b*.

As described above, according to Embodiment 2, it is possible to obtain the same advantageous effects as those in Embodiment 1. In other words, in addition to being able to configure a high-performance dehumidifying apparatus 100 by combining the adsorption and desorption effects of the desiccant material and the cooling effect of the refrigeration cycle, high-density mounting and simplification of the air passage configuration are possible, it is possible to make the apparatus compact, and it is possible to produce the apparatus at low cost.

It should be noted that in each embodiment described above, the relative humidity of the suction air is obtained from the state of the suction air obtained by the temperature and humidity sensor 50 or the temperature and humidity sensor 50*b*, but other sensing means may be used as long as the apparatus is able to estimate a relative humidity. For example, means, such as estimating a relative humidity with a sensor that directly measures a relative humidity or a sensor that measures a dew-point temperature, may be employed. Each of the temperature and humidity sensor 50 and the temperature and humidity sensor 50*b* functions as a state detection device of the present invention. In addition, the detection sensors used for measuring a low-pressure pressure and a high-pressure pressure correspond to the state detection device of the present invention as described above.

REFERENCE SIGNS LIST

1 dehumidifying apparatus 2 compressor 3 four-way valve 4 first heat exchanger 5 expansion valve 6 second heat exchanger 7 desiccant block 8 fan 8*b* fan 10 housing 11 wall surface 20 air passage chamber 20*a* air inlet (air inlet/outlet) 20*b* air outlet (air inlet/outlet) 30 machine chamber 40 drain pan 41 water path 42 drain tank 50 temperature and humidity sensor 50*b* temperature and humidity sensor 60 controller 100 dehumidifying apparatus A refrigerant circuit B air passage

The invention claimed is:

1. A dehumidifying apparatus comprising:
   a refrigerant circuit in which a compressor, a flow path switching device, a first heat exchanger, a pressure reducing device, and a second heat exchanger are connected to each other in this order by a refrigerant pipe;
   an air passage in which the first heat exchanger, a desiccant material which is capable of adsorbing and desorbing moisture, and the second heat exchanger are arranged linearly, the air passage being configured to allow air within a dehumidified space to flow through the first heat exchanger, the desiccant material, and the second heat exchanger in the order; and
   an air-sending device configured to send the air within the dehumidified space into the air passage, wherein
   a dehumidification operation is performed in which a first operation mode and a second operation mode are alternately switched by flow path switching of the flow path switching device,
      the first operation mode being a mode in which the air-sending device sends the air within the dehumidified space through the first heat exchanger acting as a condenser or a radiator, the desiccant material, and the second heat exchanger acting as an evaporator in this order,
      the second operation mode being a mode in which the air-sending device sends the air within the dehumidified space through the first heat exchanger acting as an evaporator, the desiccant material, and the second heat exchanger actin as a condenser or a radiator in this order,
   in the first operation mode, moisture retained in the desiccant material is desorbed, and
   in the second operation mode, the desiccant material adsorbs moisture from the air passing through the air passage.

2. A dehumidifying apparatus comprising:
a refrigerant circuit in which a compressor, a first heat exchanger, a pressure reducing device, and a second heat exchanger are connected to each other in this order by a refrigerant pipe;
an air passage in which the first heat exchanger, a desiccant material which is capable of adsorbing and desorbing moisture, and the second heat exchanger are arranged linearly, the air passage being configured to allow air within a dehumidified space to flow through the first heat exchanger, the desiccant material, and the second heat exchanger; and
an air-sending device provided within the air passage, wherein
a dehumidification operation is performed in which a first operation mode and a second operation mode are alternately switched,
  the first operation mode being a mode in which the air sending device sends the air within the dehumidified space through the first heat exchanger acting as a condenser, the desiccant material, and the second heat exchanger as an evaporator in this order,
  the second operation mode being a mode in which the air-sending device sends the air within the dehumidified space, through the first heat exchanger acting as an evaporator, the desiccant material, and the first heat exchanger actin as a condenser in this order,
  in the first operation mode, moisture retained in the desiccant material is desorbed, and
  in the second operation mode, the desiccant material adsorbs moisture from the air passing through the air passage.

3. The dehumidifying apparatus of claim 1, further comprising
a state detection device configured to detect a state of suction air sucked from the dehumidified space into the air passage, wherein
an operation time of each of the first operation mode and the second operation mode is determined on a basis of a state detected by the state detection device.

4. The dehumidifying apparatus of claim 3, wherein
the state detection device is a device that detects a relative humidity,
a reference operation time for each of the operation modes when a relative humidity of the suction air is a preset reference relative humidity is preset,
when the relative humidity of the suction air detected by the state detection device at time of start of the dehumidification operation is higher than the reference relative humidity, the operation time of the first operation mode is set so as to be longer than the reference operation time for the first operation mode, and the operation time of the second operation mode is set so as to be shorter than the reference operation time for the second operation mode, and
when the relative humidity of the suction air detected by the state detection device at the time of start of the dehumidification operation is lower than the reference relative humidity, the operation time of the first operation mode is set so as to be shorter than the reference operation time for the first operation mode, and the operation time of the second operation mode is set so as to be longer than the reference operation time for the second operation mode.

5. The dehumidifying apparatus of claim 1, further comprising
a state detection device configured to detect an operating state of the refrigerant circuit, wherein
an operation time of each of the first operation mode and the second operation mode is determined on a basis of a state detected by the state detection device.

6. The dehumidifying apparatus of claim 5, wherein
the state detection device is a device configured to detect a low-pressure pressure or a high-pressure pressure in the refrigerant circuit,
when the low-pressure pressure or the high-pressure pressure detected by the state detection device at time of start of the dehumidification operation is higher than a predetermined low-pressure pressure reference value or high-pressure pressure reference value, the operation time of the first operation mode is set so as to be longer than a reference operation time for the first operation mode, and the operation time of the second operation mode is set so as to be shorter than a reference operation time for the second operation mode, and
when the low-pressure pressure or the high-pressure pressure detected by the state detection device at the time of start of the dehumidification operation is lower than the predetermined low-pressure pressure reference value or high-pressure pressure reference value, the operation time of the first operation mode is set so as to be shorter than the reference operation time for the first operation mode, and the operation time of the second operation mode is set so as to be longer than the reference operation time for the second operation mode.

7. The dehumidifying apparatus of claim 1, wherein the first operation mode and the second operation mode are switched every preset time.

8. The dehumidifying apparatus of claim 1, further comprising
a frost detection device configured to detect frost in the first heat exchanger, wherein
during the second operation mode, when frost is detected by the frost detection device, the second operation mode is switched to the first operation mode even before an operation time of the second operation mode ends.

9. The dehumidifying apparatus of claim 3, further comprising
a frost detection device configured to detect frost in the first heat exchanger, wherein
during the second operation mode, when frost is detected by the frost detection device, the second operation mode is switched to the first operation mode even before an operation time of the second operation mode ends.

10. The dehumidifying apparatus of claim 4, further comprising
a frost detection device configured to detect frost in the first heat exchanger, wherein
during the second operation mode, when frost is detected by the frost detection device, the second operation mode is switched to the first operation mode even before an operation time of the second operation mode ends.

11. The dehumidifying apparatus of claim 5, further comprising
a frost detection device configured to detect frost in the first heat exchanger, wherein
during the second operation mode, when frost is detected by the frost detection device, the second operation mode is switched to the first operation mode even before an operation time of the second operation mode ends.

12. The dehumidifying apparatus of claim 6, further comprising
a frost detection device configured to detect frost in the first heat exchanger, wherein
during the second operation mode, when frost is detected by the frost detection device, the second operation mode is switched to the first operation mode even before an operation time of the second operation mode ends.

13. The dehumidifying apparatus of claim 7, further comprising
a frost detection device configured to detect frost in the first heat exchanger, wherein
during the second operation mode, when frost is detected by the frost detection device, the second operation mode is switched to the first operation mode even before an operation time of the second operation mode ends.

14. A dehumidifying apparatus comprising:
a refrigerant circuit in which a compressor, a flow path switching device, a first heat exchanger, a pressure reducing device, and a second heat exchanger are connected to each other in this order by a refrigerant pipe;
an air passage in which the first heat exchanger, a desiccant material which is capable of adsorbing and desorbing moisture, and the second heat exchanger are arranged linearly;
an air-sending device configured to send air within a dehumidified space into the air passage; and
a state detection device configured to detect a state of suction air sucked from the dehumidified space into the air passage, wherein the state detection device is a device that detects a relative humidity, wherein
a dehumidification operation is performed in which a first operation mode and a second operation mode are alternately switched by flow path switching of the flow path switching device,
the first operation mode being a mode in which the first heat exchanger acts as a condenser or a radiator, the second heat exchanger acts as an evaporator, and the air-sending device sends air within the dehumidified space through the first heat exchanger, the desiccant material, and the second heat exchanger in this order so that moisture retained in the desiccant material is desorbed,
the second operation mode being a mode in which the first heat exchanger acts as an evaporator, the second heat exchanger acts as a condenser or a radiator, and the air-sending device sends air within the dehumidified space through the first heat exchanger, the desiccant material, and the second heat exchanger in this order so that the desiccant material adsorbs moisture from air passing through the air passage, wherein
an operation time of each of the first operation mode and the second operation mode is determined on a basis of a state detected by the state detection device,
a reference operation time for each of the operation modes when a relative humidity of the suction air is a preset reference relative humidity is preset,
when the relative humidity of the suction air detected by the state detection device at time of start of the dehumidification operation is higher than the reference relative humidity, the operation time of the first operation mode is set so as to be longer than the reference operation time for the first operation mode, and the operation time of the second operation mode is set so as to be shorter than the reference operation time for the second operation mode, and
when the relative humidity of the suction air detected by the state detection device at the time of start of the dehumidification operation is lower than the reference relative humidity, the operation time of the first operation mode is set so as to be shorter than the reference operation time for the first operation mode, and the operation time of the second operation mode is set so as to be longer than the reference operation time for the second operation mode.

15. A dehumidifying apparatus comprising:
a refrigerant circuit in which a compressor, a flow path switching device, a first heat exchanger, a pressure reducing device, and a second heat exchanger are connected to each other in this order by a refrigerant pipe;
an air passage in which the first heat exchanger, a desiccant material which is capable of adsorbing and desorbing moisture, and the second heat exchanger are arranged linearly;
an air-sending device configured to send air within a dehumidified space into the air passage; and
a state detection device configured to detect an operating state of the refrigerant circuit, wherein
a dehumidification operation is performed in which a first operation mode and a second operation mode are alternately switched by flow path switching of the flow path switching device,
the first operation mode being a mode in which the first heat exchanger acts as a condenser or a radiator, the second heat exchanger acts as an evaporator, and the air-sending device sends air within the dehumidified space through the first heat exchanger, the desiccant material, and the second heat exchanger in this order so that moisture retained in the desiccant material is desorbed,
the second operation mode being a mode in which the first heat exchanger acts as an evaporator, the second heat exchanger acts as a condenser or a radiator, and the air-sending device sends air within the dehumidified space through the first heat exchanger, the desiccant material, and the second heat exchanger in this order so that the desiccant material adsorbs moisture from air passing through the air passage, and
an operation time of each of the first operation mode and the second operation mode is determined on a basis of a state detected by the state detection device.

16. The dehumidifying apparatus of claim 15, wherein
the state detection device is a device configured to detect a low-pressure pressure or a high-pressure pressure in the refrigerant circuit,
when the low-pressure pressure or the high-pressure pressure detected by the state detection device at time of start of the dehumidification operation is higher than a predetermined low-pressure pressure reference value or high-pressure pressure reference value, the operation time of the first operation mode is set so as to be longer than a reference operation time for the first operation mode, and the operation time of the second operation mode is set so as to be shorter than a reference operation time for the second operation mode, and when the low-pressure pressure or the high-pressure pressure detected by the state detection device at the time of start of the dehumidification operation is lower than the predetermined low-pressure pressure reference value or high-pressure pressure reference value, the operation time of the first operation mode is set so as to be shorter than the reference operation time for the first operation mode, and the operation time of the second operation mode is set so as to be longer than the reference operation time for the second operation mode.

17. The dehumidifying apparatus of claim 14, further comprising
a frost detection device configured to detect frost in the first heat exchanger, wherein
during the second operation mode, when frost is detected by the frost detection device, the second operation mode is switched to the first operation mode even before an operation time of the second operation mode ends.

18. The dehumidifying apparatus of claim 15, further comprising
a frost detection device configured to detect frost in the first heat exchanger, wherein
during the second operation mode, when frost is detected by the frost detection device, the second operation mode is switched to the first operation mode even before an operation time of the second operation mode ends.

19. The dehumidifying apparatus of claim 16, further comprising
a frost detection device configured to detect frost in the first heat exchanger, wherein
during the second operation mode, when frost is detected by the frost detection device, the second operation mode is switched to the first operation mode even before an operation time of the second operation mode ends.

* * * * *